United States Patent
Duffy et al.

[15] 3,660,250
[45] May 2, 1972

[54] METHOD OF DETERMINING IMPURITY PROFILE OF A SEMICONDUCTOR BODY

[72] Inventors: Michael C. Duffy, Boissise-Le-Roi, France; Richard L. Hudson, Wappingers Falls, N.Y.

[73] Assignee: International Business Machines Corporation, Armonk, N.Y.

[22] Filed: Aug. 31, 1970

[21] Appl. No.: 68,271

Related U.S. Application Data

[62] Division of Ser. No. 692,817, Dec. 22, 1967, Pat. No. 3,554,891.

[52] U.S. Cl. ............................204/1 T, 324/62 R, 324/64, 324/65 R, 324/158 D
[51] Int. Cl. ............................................G01n 27/04
[58] Field of Search ............324/158 D, 158 T, 158 R, 64, 324/62 R, 65 R; 204/1 T, 195

[56] References Cited

UNITED STATES PATENTS

| | | | |
|---|---|---|---|
| 3,067,387 | 12/1962 | Anderson et al. | 324/158 D |
| 3,109,932 | 11/1963 | Spitzer | 324/158 D X |
| 3,303,109 | 2/1967 | Just | 204/1 T |

OTHER PUBLICATIONS

R. Gereth, IBM Tech. Disclosure Bulletin, Vol. 9, No. 7, pp. 955–956, December 1966.

E. E. Gardner et al., Solid–State Electronics, Vol. 8, pp. 165–174, (1965).

H. Gunther Rudenberg, Semiconductor Products, Vol. 2, No. 9, pp. 28–34, September 1959.

Bertram Schwartz et al., " Measurement Techniques for Thin Films," The Electrochemical Soc., pp. 258–272, (1967).

Primary Examiner—G. L. Kaplan
Attorney—Hanifin and Jancin and George O. Saile

[57] ABSTRACT

A machine and method for automatically determining the distribution of impurities contained in a semiconductor body. The machine is particularly useful in determining the depth of very shallow junctions in the order of one-half micron and less. The machine successively anodizes the surface of the semiconductor body to produce an anodized semiconductor layer, removes the anodized layer by chemical etching, measures an electrical characteristic, such as spreading resistance and sheet resistance, of the semiconductor body and records the electrical characteristic in terms of the characteristic versus the amount of material removed. The machine automatically repeats this cycle until a resistivity profile for the desired depth of material is obtained. A sharp change will be observed in the recorded profile of the electrical characteristic versus the amount of material removed when a PN junction is crossed.

9 Claims, 11 Drawing Figures

PATENTED MAY 2 1972                  3,660,250

INVENTORS
MICHAEL C. DUFFY
RICHARD L. HUDSON

BY *William J. Dick*
        ATTORNEY 3,660,250

METHOD OF DETERMINING IMPURITY PROFILE OF A SEMICONDUCTOR BODY

This is a division of application Ser. No. 692,817 filed on Dec. 22, 1967, now U.S. Pat. No. 3,554,891.

BACKGROUND OF THE INVENTION

1. Field of the Invention

The present invention is directed to a method and apparatus for determining the characteristics of semiconductor devices, more particularly a method and apparatus for the determination of the distributions of impurities within a semiconductor device. The method and the apparatus produces a resistivity profile which can be converted to a concentration profile within the semiconductor and allows the accurate measurement of even shallow junction depths and the determination of the fine details of the impurity distributions in semiconductor junction structures.

2. Description of the Prior Art:

It has been the practice to use the well-known angle lap and stain technique to measure the position of the PN junctions in a semiconductor structure. This involves beveling through the junctions at a very shallow angle, such as 1° to 5°, and preferentially staining the N and P areas. This technique however, is unsuitable for very shallow junctions, such as less than about one-half micron, which are encountered in the more advanced device designs. The major criticism with the bevel and stain technique is that for very shallow junctions, such as less than one-half micron, it is impossible to get accurate junction depth measurements. Further, this work must be done by hand, is very tedious and time consuming even to the most skilled technician.

SUMMARY OF THE INVENTION

It is thus an object of the present invention to provide a method for automatically determining the impurity profile of a semiconductor body.

It is another object of this invention to provide a method for determining the depth of a PN junction in a semiconductor body by automatic procedures.

It is a still further object of this invention to provide a completely automatic process for determining the impurity profile and the PN junction depth of a semiconductor device.

These objects are accomplished in accordance with the broad aspects of the present invention by providing an automatic procedure which successively anodizes the semiconductor body to produce an anodized semiconductor layer, removes the anodized layer, measure an electrical characteristic of the semiconductor body and records the electrical characteristic in terms of the characteristic versus the amount of material removed. This procedure is repeated automatically for the desired depth of the material to be profiled.

The impurity profile is then used to characterize the semiconductor body and to determine depths of the PN junctions within the semiconductor body by observing any sharp changes in the impurity profile. The anodizing technique allows the controlled removal of a very small quantity of semiconductor material. Prior art methods, such as chemical etch and mechanical polishing, could not accurately control the removal of quantities of semiconductor much less than about 5,000 angstrom units. The anodizing method can remove semiconductor layer thicknesses of as little as 100 angstrom units conveniently.

The impurity profile measuring apparatus includes a container having input and output ports. Within the container the semiconductor is supported in such a fashion as to make a semiconductor substrate the anode of the apparatus. A suitable cathode contact is positioned within the container. A device for measuring an electrical characteristic is positioned in such a manner as to allow its function at the appropriate time within the method's cycle. The measuring device has an output to a suitable recording means which is programmed for recording the electrical characteristic in terms of the characteristic versus the amount of material removed. Control means cause the automatic cycle of the input and output of anodizing solutions into and out of the container, the application of an anodizing potential between the anode and cathode while the anodizing solution is in the container, the input and output of an etching solution following the output of the anodizing solution; the means for measuring cause it to make a measurement of the electrical characteristic and the means for recording the electro-characteristic.

The foregoing and other objects, features and advantages of the invention will be apparent from the following more particular description of preferred embodiments of the invention, as illustrated in the accompanying drawing.

DESCRIPTION OF THE PREFERRED EMBODIMENTS

Figure 1:
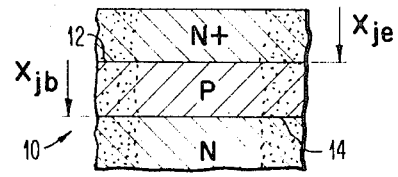
FIG. 1 is a greatly enlarged cross section of a semiconductor device showing two PN junctions.
Figure 2:
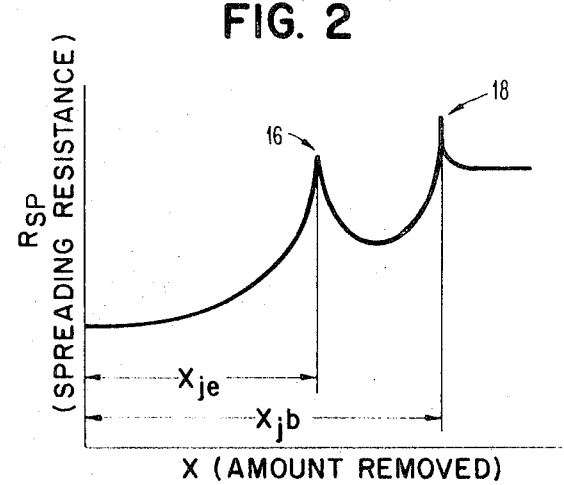
FIG. 2 illustrates a typical electrical characteristic profile which corresponds to the FIG. 1 semiconductor device structure.

Referring more particularly to FIGS. 1 and 2 the process of the invention may be readily understood. FIG. 1 illustrates in an enlarged cross section, an NPN semiconductor structure 10 having an N$^+$-P junction characteristic of an emitter base junction 12 and a PN junction characteristic of a base collector junction 14. FIG. 2 shows the spreading resistance profile curve of the FIG. 1 structure which results from the method of the present invention. The FIG. 2 resistance profile has the electrical spreading resistance characteristic of the semiconductor structure recorded versus the amount of material removed. At each PN junction, the spreading resistance increases very rapidly resulting in sharp peaks which are shown at 16 and 18 which represent the depths of $X_{je}$, the emitter-base junction, and the $X_{jb}$, the base-collector junction.

Figure 3:
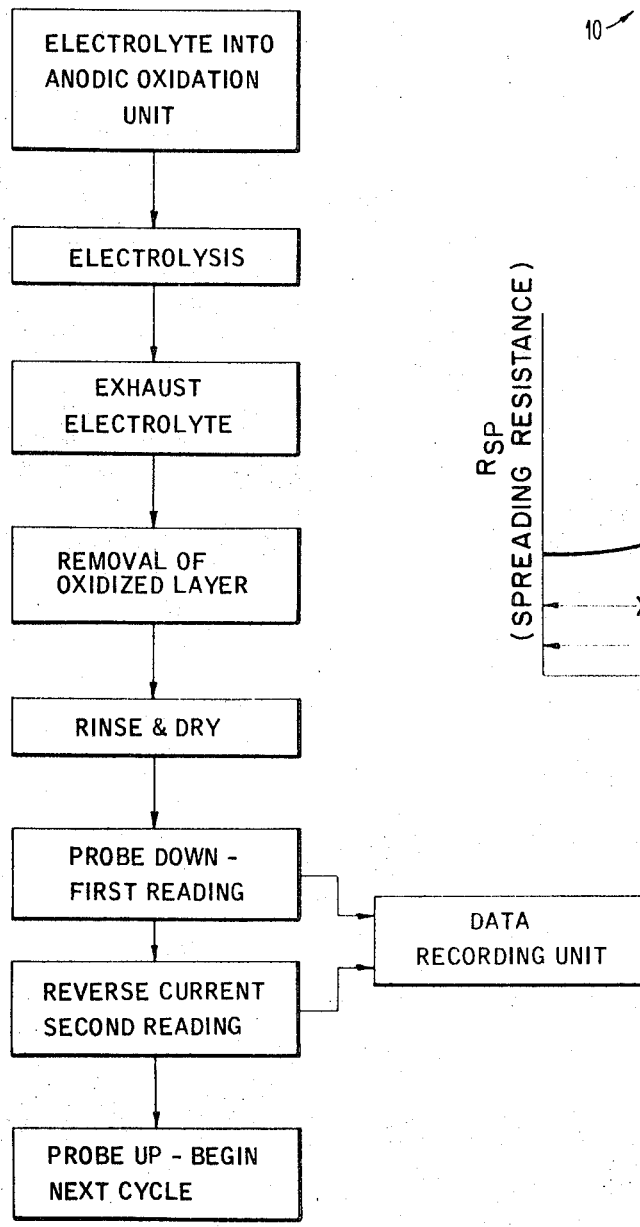
FIG. 3 is a flow diagram of one form of the process of the present invention.

The flow diagram given as FIG. 3 illustrates the steps in the process used to obtain a resistivity profile such as shown in FIG. 2. The semiconductor structure to have its impurity profile determined is placed in the anodic oxidation unit. The semiconductor structure is attached to the positive terminal of a variable DC supply voltage. Another electrode is suitably placed so that it will be subsequently covered with electrolyte. The electrolyte is then flowed into the anodic oxidation unit. The application of the voltage in the suitable electrolyte causes the growth of an oxide on the semiconductor device surface. The amount of this growth of oxide is controlled by the time in the electrolyte and the particular electrolyte utilized and voltage applied. When the desired increment of oxide is obtained the voltage is removed and the electrolyte is exhausted from the oxidation unit. The oxidized layer is then removed by the use of a suitable etchant. The semiconductor is then rinsed and dried. A spreading resistance or sheet resistance probe is then applied to the surface of the semiconductor device and the resistance measured. A sheet resistance measurement by the four-point method is the most commonly used method for resistivity movement. The spreading resistance measurement by a three-point probe is a simplification of the four-point method. (Reference: "Fundamentals of Silicon Integrated Device Technology," Volume I, edited by R. M. Burger and R. P. Donovan, pages 421–422, Prentice-Hall series.) A reverse current resistance reading is then obtained using the resistance probe. The two resistance readings are electrically recorded in a data recording unit. The resistance probe is then raised and the cycle repeated. The cycle is repeated many times until the desired amount of semiconductor material is removed. The removal is in small increments such as, for example, 100–300 angstrom units per cycle. A spreading resistance profile such as shown in FIG. 2 is the result of this automatic recycling process.

Figure 4:
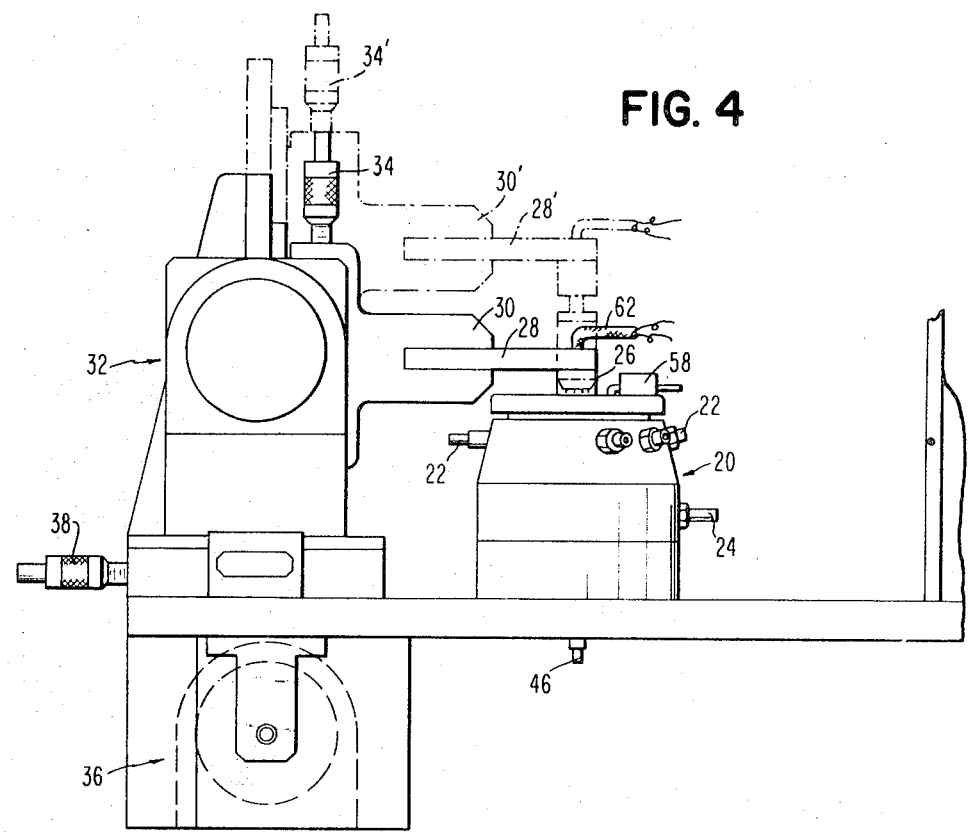
FIG. 4 is a side view of a preferred anodizing unit of the impurity profile measuring apparatus.
Figure 5:
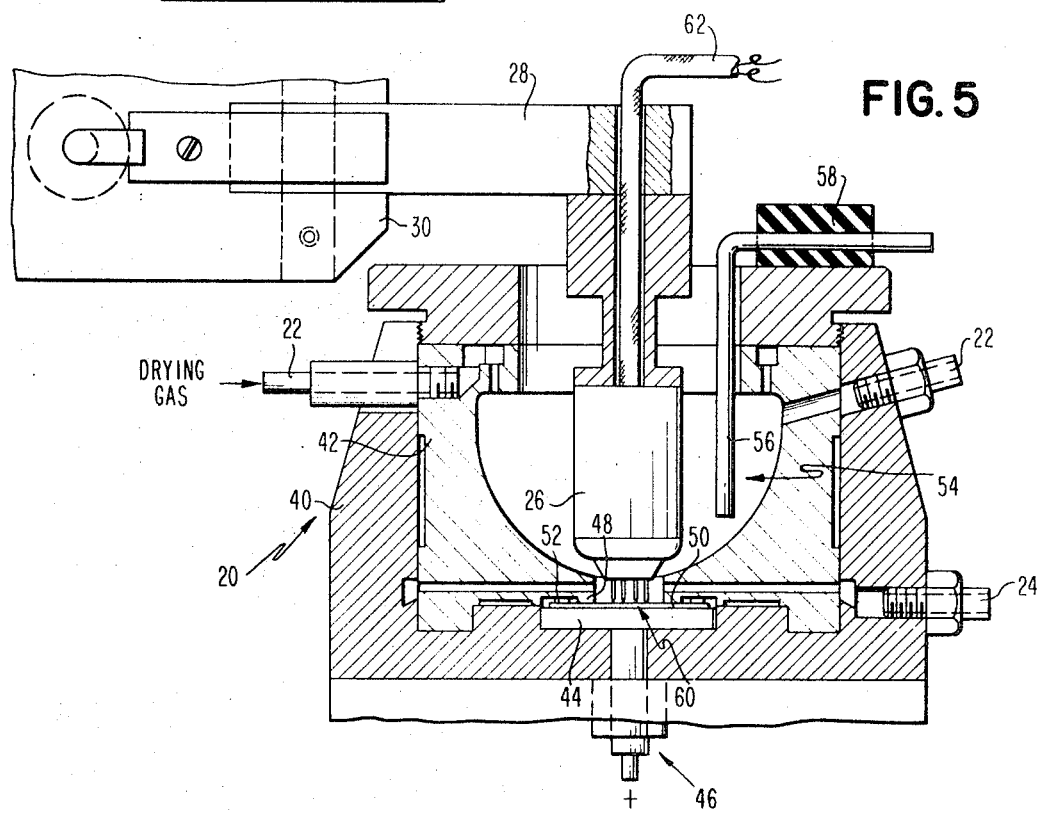
FIG. 5 is an enlarged cross section of the anodizing container portion of the FIG. 4 impurity profile measuring apparatus.
Figure 6:
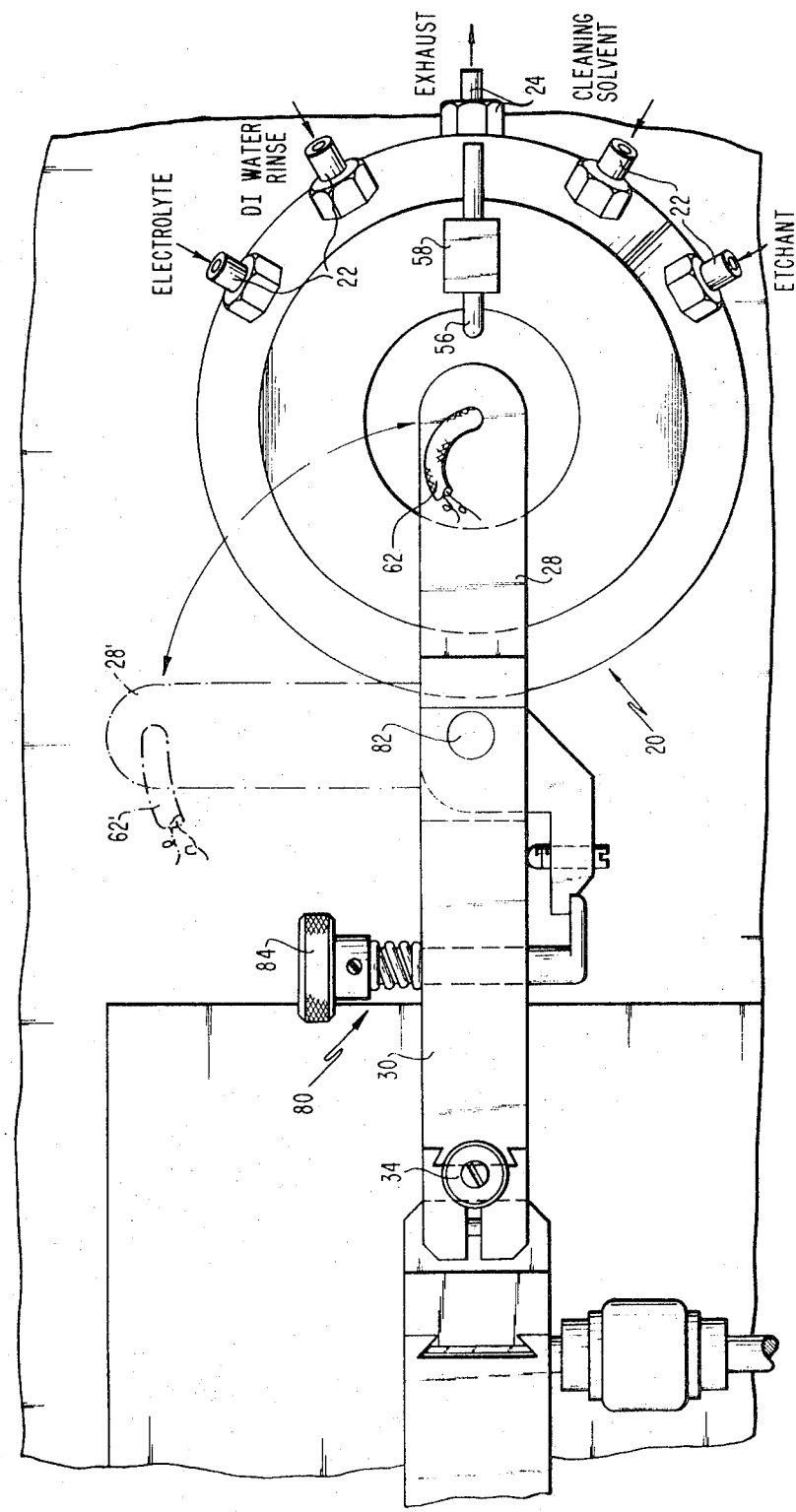
FIG. 6 is a top view of the container portion of the FIG. 4 impurity profile measuring apparatus.

The anodic oxidation unit is illustrated in FIGS. 4–6. The unit includes a container 20 having input ports 22 and output or exhaust port 24. A probe 26 for measuring the spreading or sheet resistance of a semiconductor device mounted within the container 20 is capable of being moved into and out of the container 20. A probe arm 28 supports the probe. Clamp 30 holds the probe arm 28. Further suitable mechanical linkage (not shown) connects the probe arm to the motor 32 which drives the probe into and out of the container 20. An up and down adjustment micrometer 34 is used to make a fine probe adjustment. The dashed lined structures and numbers having primes indicate the structural elements of the probe and supporting structures which are fully raised out of the container 20. The solid lined structures and the unprimed numbers correspond to the probe structure fully inserted into the container 20. An indexing motor 36 is provided with suitable mechanical linkage (not shown) which drives the probe into and out of the paper in very small increments. The micrometer 38 allows the fine adjustment of the probe from left to right on the surface of the drawing.

FIGS. 5 and 6 show the detailed construction of the anodizing container 20. 20 includes the anodizing cup 40 having a clamping insert 42. At the bottom of the anodizing cup is a copper electrode block 44 which is appropriately electrically connected as anode of the cell by electrical conductor 46. The clamping insert 42 has clamping structure 48 which holds the semiconductor device 50 onto the upper electrode 44 securely. A washer 52 which may be composed of, for example, a polyvinyl material can additionally be inserted between the clamping insert 42 and the electrode 44 to form an additional portion of the clamping structure. The clamping insert 42 has suitable openings which align with the ports 22 and 24 in the anodizing cup 40 to allow the suitable input and output flow of liquids and gases to and from the open area 54. A suitable electrode 56, which may be composed of a noble metal such as platinum, is positioned within the area 54 so that the electrode will be submerged in the electrolyte. This electrode is connected as the negative terminal of the anodization cell. The electrode 56 is suitably insulated from the container 40 by insulating material 58.

The probe 26 is illustrated as having four contact points 60 useable in taking the electrical measurements. The four point probe 26 is electrically connected by means of conductor 62 to the data recording unit. FIGS. 5 and 6 illustrate by arrow and identification the materials which flow into the container 40 and which are exhausted therefrom. It is therefore seen that the input ports include the electrolyte input, the deionized water rinse input, the cleaning solvent input, the etchant input and the drying gas input. In addition there is the container exhaust output. The connecting tubings which connects the source of the fluids and vapors that flow into and out of the container 40 to the input and output ports 22 and 24 are not shown for simplicity sake.

FIG. 6 additionally shows an arm release mechanism 80 which allows the swinging of the probe arm completely out of the way of the top opening to the container 20. This includes a joint 82 in the probe arm and a screw clamp 84 which holds the joint rigid until it is desired to swing the probe arm 28 and the attached probe 26 completely out of the way of the top container 20 opening. The dashed lined structures and numbers having primes indicate the structural elements of the probe and arms structures which are fully swung away from the container 20. The solid lined structures and the unprimed numbers correspond to the probe and arm structures in their normal position.

Figure 7:
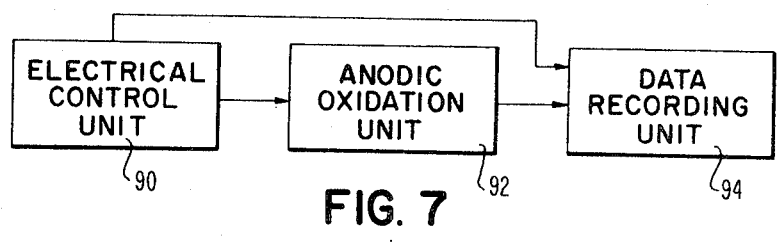
FIG. 7 is a block diagram of an impurity profile measuring apparatus.

FIG. 7 shows the overall structural connection between the electrical control unit 90, the anodic oxidation unit 92 and the data recording unit 94. These are the major elements of the impurity profile measuring apparatus. The electrical control unit 90 is the means for controlling the input and output of the anodizing solutions into the container, the application of an anodizing potential between the anode and cathode of the cell while the anodizing solution is in the container, the means for causing the measurement of the desired electrical characteristic of the semiconductor device under test, and the means for causing the recording of the measured electrical characteristic. Further, the control unit 90 causes the continuous cycling of the process until the desired impurity profile is obtained in the data recording unit. In the preferred system the electrical control unit 90 controls the following cycle:

1. electrolyte in
2. electrolysis
3. exhaust of electrolyte
4. de-ionized water in and exhaust
5. etching solution in and exhaust
6. de-ionized water in and exhaust
7. cleaning solution in and exhaust
8. drying as in and exhaust
9. probe down — reading No. 1
10. reverse current — reading No. 2
11. probe up
12. the cycle is then repeated.

The electrical control unit 90 is a electrical circuit composed of timers, relays and electrically operated valves which cause the sequential performance of the cycle described above. The details of the circuit are not included for simplicity sake.

Figure 11:
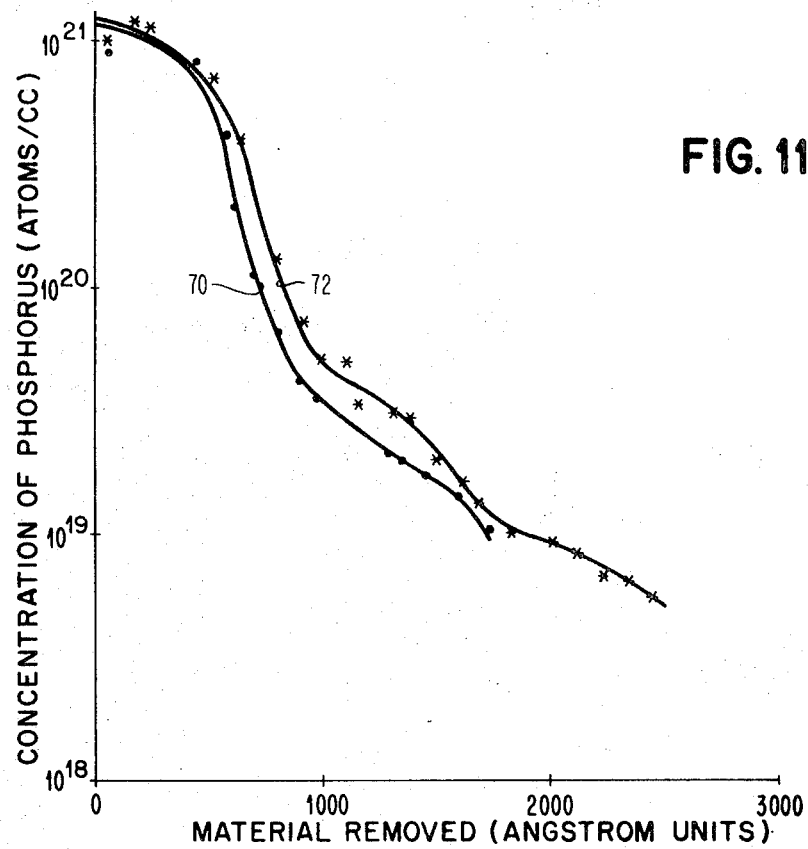
FIG. 11 is an impurity distribution profile comparing the results of the method of the present invention to the radio tracer neutron-activation method.

The data recording unit 94 is composed of a 3440A Hewlett Packard Digital Voltmeter connected to a H-P 562A Digital Recorder. When the voltmeter is triggered, the output of the voltmeter is fed into the Recorder which records the reading in the form of sheet resistance, spreading resistance or photovoltage versus material removed. The profile as in FIG. 11 is not directly determined from the data. The data is fed into a computer (not shown) which in turn converts the data to an impurity profile.

Semiconductor devices composed of silicon germanium can readily have their junction profiles obtained according to the automated method of the present invention. There are a variety of suitable anodization electrolytes for both silicon and germanium. Examples for silicon are nitric acid ($HNO_3$), ethylene glycol, tetrahydrofurfuryl alcohol with sodium nitrite ($NaNo_2$). An example for germanium is hot water. The preferred electrolyte for silicon is a mixture of N-Methylacetamide, potassium nitrate and water. An example for the silicon dioxide is hydrofluoric acid (HF).

The sheet resistance measurement is made by the four-point probe method and spreading resistance measurement is made by the three-point probe method as illustrated by the flow diagram and the measuring apparatus of FIGS. 4 through 6. The sheet resistance, $R_s$, is related to the concentration of impurity by the following equation.

$$d(1/R_s)/dx = Tx = Cx\, uq$$

when $q$ is the electron charge, $u$ the effective carrier mobility, $Tx$, the conductivity and $Cx$ is the concentration of impurities. A computer program is utilized in the computation of the concentration values as a function of material removed. (Reference: "Detail Analysis of Thin Phosphorus Diffused Layers in P-type Silicon," E. Tannenbaum, Solid State Electronics 2, March 1961, pp. 123–132.)

A photoelectric technique can be used to replace the spreading resistance measurement. This procedure used the rectifying properties of semiconductor junctions. Two probes, with a high impedance voltimeter connected across them are brought down onto the surface of the wafer which has been illuminated with a light source. The light induced current is read on the voltmeter. Depending upon the impurity type of semiconductor material, a certain polarity of current is indicated on the voltmeter. Once the junction is passed by the removal process of the present invention, the observed polarity reverses. The junction is at the point of reversal of the polarity of the current. The graphical plot of the photovoltage as a function of the amount of material being removed, provides the position of the junction in the semiconductor structure.

Where a silicon semiconductor structure is to be profiled, the preferred electrolyte is a mixture of 100 millimeters of N-Methylacetamide, 1 gram of potassium nitrate, and 25 ml. of de-ionized water. With the silicon device connected as the positive terminal of the anodization cell and a platinum electrode immersed in the electrolyte as the negative electrode, the application of a suitable voltage across the cell produces a growth of silicon dioxide on the surface of the silicon material. This anodization reaction proceeds to an oxide thickness governed by the voltage applied. FIG. 7 shows the difference between the silicon dioxide thickness for P-type doped silicon and an/N-type doped silicon device in the range of 100 to 1,300 angstrom units of silicon dioxide as a function of applied voltage.

The following examples of the present invention are included in order to aid in the understanding of the invention and variations may be made by one skilled in the art without departing from the spirit and scope of the invention.

EXAMPLE 1

Figure 9:
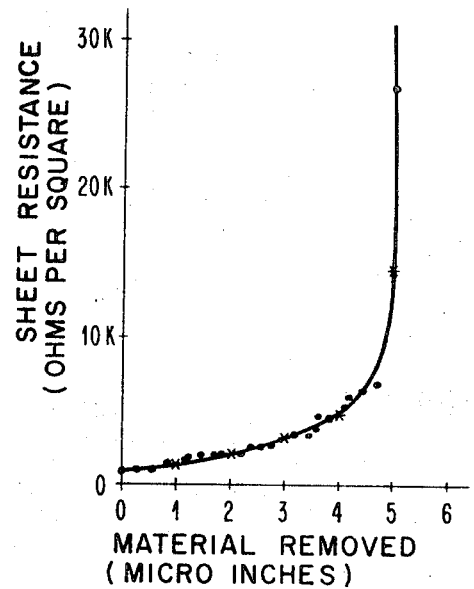
FIG. 9 is a graphical representation of sheet resistance versus material removed.
Figure 10:
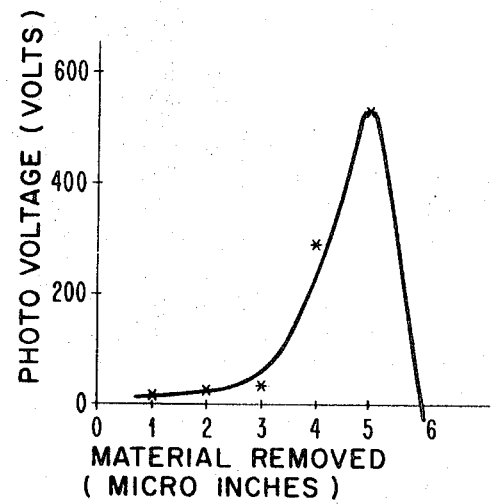
FIG. 10 is a graphical representation of photovoltage versus material removed.
Figure 8:
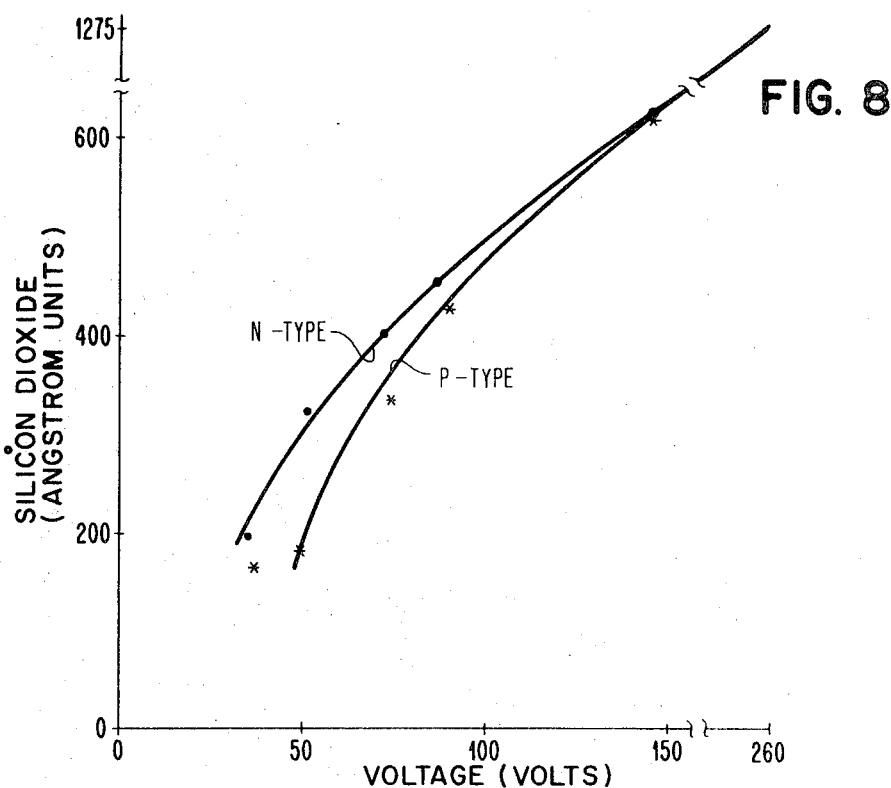
FIG. 8 is a graphical representation showing silicon dioxide thickness versus voltage applied.

Three N-type silicon semiconductor wafers were placed in a suitable diffusion capsule. A boron source of $2.5 \times 10^{19}$ atoms/cc. was placed in the capsule. Diffusion of the boron source into the silicon N-type wafer was accomplished at a temperature of 1,000° for a period of 60 minutes. The resulting surface concentration of the wafers was $2.5 \times 10^{19}$ atoms/cc. Each of the silicon wafers had their impurity profile determined by the automatic method using the apparatus of FIG. 4–6. The first wafer was automatically profiled using the removal of 1 micro inch of silicon per cycle. The sheet resistance and the photovoltage were recorded after each cycle according to the techniques of the present invention described above. The second silicon wafer was processed using a removal of 0.64 micro inches of silicon per cycle and the sheet resistance were recorded after each cycle. The third wafer was processed using a removal of 0.3 micro inches of silicon per cycle and the sheet resistance were recorded. FIG. 9 shows the result of the plotting of the silicon removal versus the sheet resistance for each of the three wafers. As can be readily seen from the profile of FIG. 9 there is excellent corrolation between all three of the automatic impurity profile runs regardless of the amount of material removed per cycle. FIG. 10 shows the photovoltage versus the material removed for the first silicon wafer processed. The sheet resistance versus material removed and the photovoltage versus material removed in FIGS. 9 and 10, respectively, show that the junction depth is very close to 5 micro inches in depth.

EXAMPLE 2

Two P-type monocrystalline silicon wafers were doped with phosphorus to a surface concentration of $1 \times 10^{21}$ atoms/cc. by the conventional open tube diffusion process. One wafer was processed according to the automatic method of the present invention wherein there was a removal of 0.3 micro inches per cycle. The concentration of the phosphorus in atoms/cc. was obtained from the electrical resistance measurement combined with the aforementioned calculation technique, and was plotted against material removed in angstrom units. The impurity distribution of the second sample was obtained by the radio tracer neutron-activation method. This method involves the bombardment of the sample with neutrons causing the phosphorus atoms to become radioactive. Increments of material are removed by the anodizing technique and the phosphorus atoms at each increment is counted by a liquid scintillation counter. (Reference: "Fundamentals of Silicon Integrated Device Technology," Volume 1, edited by R. M. Burger and R. P. Donovan, pages 405–407, Prentice-Hall series) FIG. 11 shows the results of this experiment. Curve 70 shows the impurity profile as determined by the automatic method of the present invention. Curve 72 shows the impurity profile determined by the neutron-activation method. The results indicate the total impurity concentration as seen from the curve 70 as only slightly higher than the electrically active impurity concentration as determined from the automatic impurity profile method, which is to be expected because it is known that because of precipitation at dislocations in silicon the electrical active impurities is less than the total impurities.

EXAMPLES 3 THROUGH 7

Junctions of various depths were made by capsule diffusions. The bevel and stain technique which involve the use of beveling the junction at a very shallow angle of about 2° and preferentially staining the N and P areas. The depth was then measured by conventional optical means to obtain the junction depth in each case. For a like sample the automatic profiling impurity profile apparatus of the present invention was used. The following table gives the type of diffusion, the surface concentration of the dopant, the junction depth as determined from the bevel and stain technique and the junction depth as determined from the automatic profiling technique of the present invention.

| Type of Diffusion | $C_o$ (source) | $X_j$ (B & S) | $X_j$ (system) |
|---|---|---|---|
| Boron base | $3 \times 10^{19}$ atoms/cc. | $14.8\mu$ in | $14\mu$ in |
| Phosphorus emitter | $1 \times 10^{21}$ atoms/cc. | $8.2\mu$ in | $10.5\mu$ in |
| Boron base | $3 \times 10^{19}$ atoms/cc. | $15.7\mu$ in | $14\mu$ in |
| Boron base after heating step in inert atmosphere | $3 \times 10^{19}$ atoms/cc. | $12.0\mu$ in | $11.5\mu$ in |
| Boron base before heating step | $3 \times 10^{19}$ atoms/cc. | $10\mu$ in | $9.5\mu$ in |

The resulting comparison between the methods appear to be excellent.

While the invention has been particularly shown and described with reference to preferred embodiments thereof, it will be understood by those skilled in the art that various changes in form and details may be made therein without departing from the spirit and scope of the invention.

What is claimed is:

1. The method for automatically determining the impurity profile of a semiconductor body comprising:
    successively anodizing the said semiconductor body to produce an anodized semiconductor layer, removing said anodized layer, measuring an electrical characteristic of said semiconductor body, and recording said electrical characteristic in terms of the said characteristic versus the amount of material removed; and
    repeating said successive anodizing, removing, measuring, and recording steps until the electrical characteristic profile for the desired depth of material is obtained.

2. The method for determining the depth of a PN junction in a semiconductor body comprising:

successively anodizing the said semiconductor body to produce an anodized semiconductor layer, removing said anodized layer, measuring the resistance of said PN junction, and recording said resistance in terms of resistance versus the amount of material removed; and repeating said successive anodizing, removing, measuring, and recording steps until a sharp change is observed in the recorded trend of said resistance versus amount of material removed which change indicates the depth of said PN junction.

3. The method of claim 2 wherein the aid semiconductor body is silicon and the anodized layer is an oxide of silicon.

4. The method of claim 2 wherein a four point probe device measures said resistance in the form of sheet resistance using a forward current and a reverse current.

5. The method of claim 2 wherein a three point probe device measures said resistance in the form of spreading resistance using a forward current and a reverse current.

6. The method of claim 2 wherein the said junction is less than about one-half micron in depth, and between about 50 to 1,300 angstrom units of an oxide of silicon is grown by anodization and removed by chemical etching in each cycle.

7. The method of claim 5 wherein an N-Methylacetamide, water and potassium nitrate anodizing electrolyte and an hydrofluoric acid etching solution are used.

8. A method for determining the impurity profile of a semiconductor body comprising the steps of:
 anodizing said semiconductor body to produce an anodized semiconductor layer;
 removing said anodized layer;
 measuring an electrical characteristic of the semiconductor body;
 repeating said anodizing, removing and measuring steps until an electrical characteristic profile for the desired depth of material is obtained.

9. A method for determining the impurity profile of a semiconductor body in accordance with claim 8 including the step of recording said electrical characteristic in terms of the characteristic versus the amount of material removed.

* * * * *